(12) United States Patent
Oglesby et al.

(10) Patent No.: US 12,113,687 B2
(45) Date of Patent: Oct. 8, 2024

(54) SYSTEM AND METHOD FOR OUTAGE PREDICTION

(71) Applicant: Computer Sciences Corporation, Ashburn, VA (US)

(72) Inventors: Marc Oglesby, Arlington, TX (US); Nick Tamburro, Brunswick West (AU); Betty Lau, Richmond Hill (CA); Ya Xue, Chapel Hill, NC (US); Jun Liu, Cary, NC (US)

(73) Assignee: COMPUTER SCIENCES CORPORATION, Ashburn, VA (US)

( * ) Notice: Subject to any disclaimer, the term of this patent is extended or adjusted under 35 U.S.C. 154(b) by 0 days.

(21) Appl. No.: 18/314,647

(22) Filed: May 9, 2023

(65) Prior Publication Data

US 2023/0370350 A1 Nov. 16, 2023

Related U.S. Application Data

(60) Provisional application No. 63/340,679, filed on May 11, 2022.

(51) Int. Cl.
| | |
|---|---|
| *H04L 43/067* | (2022.01) |
| *H04L 41/0604* | (2022.01) |
| *H04L 41/149* | (2022.01) |
| *H04L 41/16* | (2022.01) |
| *H04L 43/0817* | (2022.01) |

(52) U.S. Cl.
CPC ........ *H04L 43/067* (2013.01); *H04L 41/0627* (2013.01); *H04L 41/149* (2022.05); *H04L 41/16* (2013.01); *H04L 43/0817* (2013.01)

(58) Field of Classification Search
CPC .......................... G06F 16/24568; G06N 3/045
See application file for complete search history.

(56) References Cited

U.S. PATENT DOCUMENTS

| | | | |
|---|---|---|---|
| 9,542,296 B1 | 1/2017 | Engers et al. | |
| 2010/0238815 A1* | 9/2010 | Kohout | H04L 43/0817 370/252 |

(Continued)

OTHER PUBLICATIONS

International Search Report and Written Opinion of the International Searching Authority in related PCT Application No. PCT/US2023/021555, mailed Jul. 31, 2023, 8 pages.

*Primary Examiner* — Barbara B Anyan
(74) *Attorney, Agent, or Firm* — Polsinelli PC

(57) ABSTRACT

An exemplary method, for preventing an outage in a network, includes collecting network metrics and producing statistical features of the network during a predetermined time window based on statistical analysis of the collected metrics. The method further includes selecting, from the produced statistical features, a first data set of relevant statistical features. Further, the method includes collecting information about a past event, extracting event data from the past event, and vectorizing the extracted event data to form a second data set. The method further includes concatenating the first data set and the second data set to form a third data set and classifying the third data set relative to a model of historical network performance to determine a probability of the outage. Further, the method includes modifying, in response to the probability being above a threshold, the network/activity within the network to avoid onset of the outage.

18 Claims, 6 Drawing Sheets

(56) References Cited

U.S. PATENT DOCUMENTS

| | | | |
|---|---|---|---|
| 2012/0009890 A1* | 1/2012 | Curcio | H04W 4/029 |
| | | | 455/230 |
| 2013/0046725 A1* | 2/2013 | Cammert | G06F 16/24568 |
| | | | 706/58 |
| 2016/0088006 A1* | 3/2016 | Gupta | H04L 41/149 |
| | | | 706/12 |
| 2019/0044825 A1 | 2/2019 | Vijayakumar et al. | |
| 2023/0118240 A1* | 4/2023 | Wong | G06N 3/045 |
| | | | 705/44 |

* cited by examiner

SYSTEM AND METHOD FOR OUTAGE PREDICTION

CROSS REFERENCE TO RELATED APPLICATIONS

The instant Application claims priority to U.S. Provisional Application 63/340,679 entitled SYSTEM AND METHOD FOR OUTAGE PREDICTION filed May 11, 2022, the contents of which are incorporated by reference herein in its entirety.

FIELD OF THE INVENTION

Various embodiments described herein relate generally to methods and systems for preventing problems in a network. More specifically, various embodiments described herein relate to predicting outages within the network.

BACKGROUND

Network element(s) and/or network(s) face problems such as outages due to various reasons like architectural complexity, increase in operational load on networks, unplanned network events, and so on. These problems result in downtimes that cause unavailability of specific network element(s) or interruption to routine functions/operations of the network. Consequently, in scenarios where such a network is accessed by a large user/customer base, a downtime hampers productivity of such users/customers and further leads to loss of revenue for the business and/or enterprise offering IT services to their customers. Further, the existing solutions to combat such problems/outages are time-consuming and require manual intervention for redressal, which further adds to the service/delivery cost.

SUMMARY

According to an embodiment of the invention, a method for preventing an outage within a network is provided. The method comprises: collecting network metrics; statistically analyzing the collected network metrics from a predetermined time window to produce statistical features of the network during the time window; selecting, from the produced statistical features, a first data set of relevant ones of the produced statistical features; collecting information about a past event; extracting event data from the past event; vectorizing the extracted event data to form a second data set including the extracted event data; concatenating the first data set and the second data set to form a third data set; classifying the third data set relative to a model of historical network performance to determine a probability of the outage within the network; and modifying, in response to the probability of the outage being above a threshold, the network and/or activity within the network to avoid onset of the outage.

The above embodiment may have various option features. The outage may include a full loss of service or a decline in service. Further, each of the first data set, second data set, and third data set may comprise one or more data points. The model may be trained using same process from collecting the network metrics till classifying the third data set iteratively, to classify the third data set using the trained model. Modifying the network and/or activity within the network may comprise fully restoring a state of the network to an ideal state of the network. Modifying the network and/or activity within the network may comprise partially restoring a state of the network to a limit. The extracted event data may include a type of event and a timestamp associated with the past event. The network metrics may include Central Processing Unit (CPU) usage, memory usage, memory swap, space usage, disk input/output operations, and system throughput. Collecting the network metrics may comprise sampling system metrics at predefined time intervals. The first data set of relevant ones of the produced statistical features may be defined by a pre-existing model.

According to an embodiment of the invention, A non-transitory computer readable media storing instructions programmed to prevent an outage in a network and programmed to cooperate with a processor to perform operations is provided. The operations comprise: collecting network metrics; statistically analyzing the collected network metrics from a predetermined time window to produce statistical features of the network during the time window; selecting, from the produced statistical features, a first data set of relevant ones of the produced statistical features; collecting information about a past event; extracting event data from the past event; vectorizing the extracted event data to form a second data set including the extracted event data; concatenating the first data set and the second data set to form a third data set; classifying the third data set relative to a model of historical network performance to determine a probability of the outage within the network; and modifying, in response to the probability of the outage being above a threshold, the network and/or activity within the network to avoid onset of the outage.

The above embodiment may have various option features. The outage may include a full loss of service or a decline in service. Further, each of the first data set, second data set, and third data set may comprise one or more data points. The model may be trained using same process from collecting the network metrics till classifying the third data set iteratively, to classify the third data set using the trained model. Modifying the network and/or activity within the network may comprise fully restoring a state of the network to an ideal state of the network. Modifying the network and/or activity within the network may comprise partially restoring a state of the network to a limit. The extracted event data may include a type of event and a timestamp associated with the past event. The network metrics may include Central Processing Unit (CPU) usage, memory usage, memory swap, space usage, disk input/output operations, and system throughput. Collecting the network metrics may comprise sampling system metrics at predefined time intervals. The first data set of relevant ones of the produced statistical features may be defined by a pre-existing model.

According to an embodiment of the invention, a system is provided. The system includes a non-transitory computer readable media storing instructions and a processor programmed to cooperate with the instructions to perform operations comprising: collecting network metrics; statistically analyzing the collected network metrics from a predetermined time window to produce statistical features of the network during the time window; selecting, from the produced statistical features, a first data set of relevant ones of the produced statistical features; collecting information about a past event; extracting event data from the past event; vectorizing the extracted event data to form a second data set including the extracted event data; concatenating the first data set and the second data set to form a third data set; classifying the third data set relative to a model of historical network performance to determine a probability of the outage within the network; and modifying, in response to the probability of the outage being above a threshold, the network and/or activity within the network to avoid onset of the outage.

The above embodiment may have various option features. The outage may include a full loss of service or a decline in service. Further, each of the first data set, second data set, and third data set may comprise one or more data points. The model may be trained using same process from collecting the network metrics till classifying the third data set iteratively, to classify the third data set using the trained model. Modifying the network and/or activity within the network may comprise fully restoring a state of the network to an ideal state of the network. Modifying the network and/or activity within the network may comprise partially restoring a state of the network to a limit. The extracted event data may include a type of event and a timestamp associated with the past event. The network metrics may include Central Processing Unit (CPU) usage, memory usage, memory swap, space usage, disk input/output operations, and system throughput. Collecting the network metrics may comprise sampling system metrics at predefined time intervals. The first data set of relevant ones of the produced statistical features may be defined by a pre-existing model.

DRAWINGS

Various embodiments in accordance with the present disclosure will be described with reference to the drawings, as follows.

DETAILED DESCRIPTION

Figure 1:
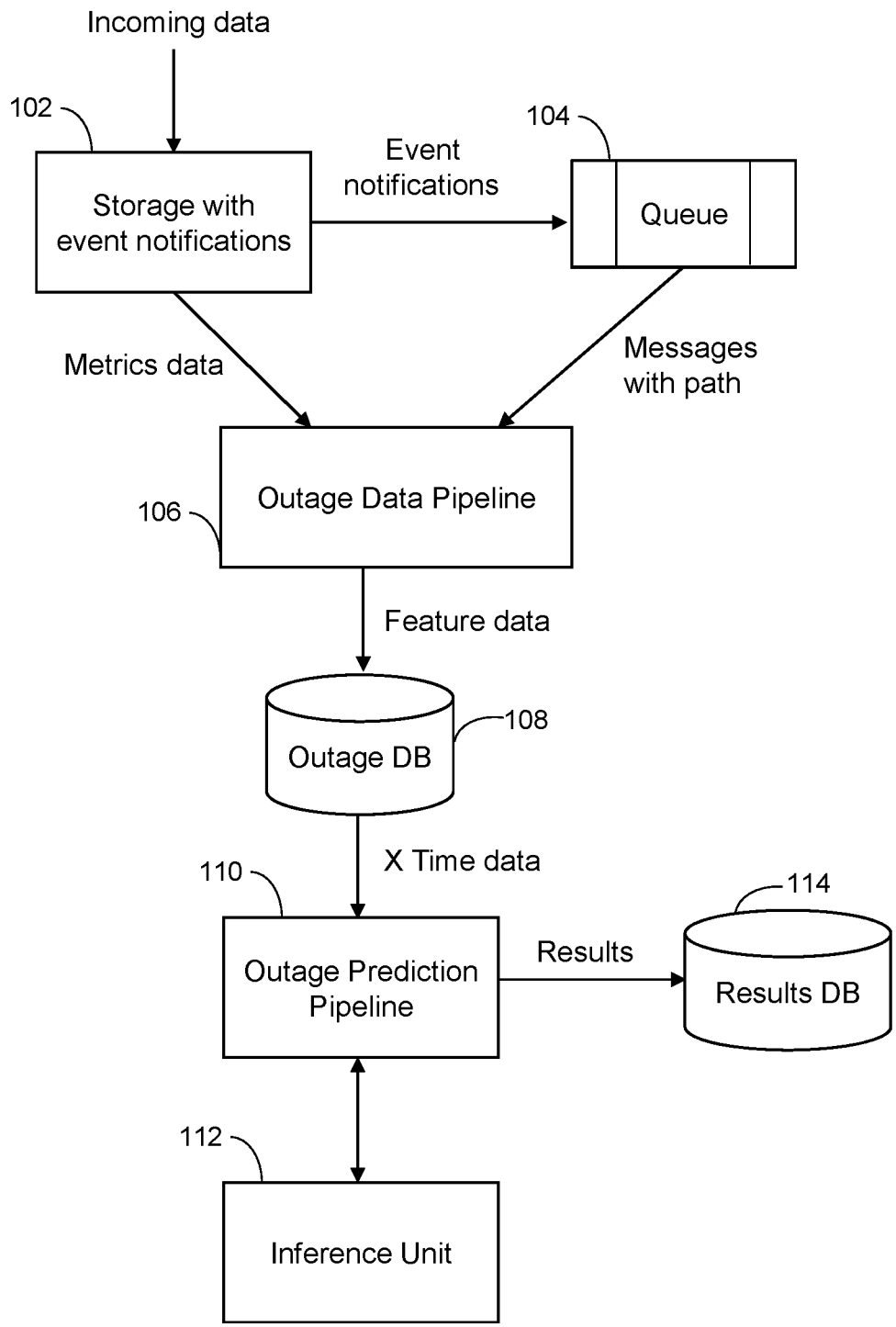
FIG. 1 shows a block diagram indicating components of an outage prediction system, according to an embodiment of the present disclosure.

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope and spirit of the claimed subject matter.

Specific details are provided in the following description to provide a thorough understanding of embodiments. However, it will be understood by one of ordinary skill in the art that embodiments may be practiced without these specific details. For example, systems may be shown in block diagrams so as not to obscure the embodiments in unnecessary detail. In other instances, well-known processes, structures and techniques may be shown without unnecessary detail in order to avoid obscuring example embodiments.

References to one or an embodiment in the present disclosure can be, but not necessarily are, references to the same embodiment; and such references mean at least one of the embodiments.

References to any "example" herein (e.g., "for example", "an example of", by way of example" or the like) are to be considered non-limiting examples regardless of whether expressly stated or not.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various features are described which may be features for some embodiments but not other embodiments.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any exemplified term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Several definitions that apply throughout this disclosure will now be presented. The term "comprising" when utilized means "including, but not necessarily limited to"; it specifically indicates open-ended inclusion or membership in the so-described combination, group, series and the like. The term "a" means "one or more" unless the context clearly indicates a single element. The term "about" when used in connection with a numerical value means a variation consistent with the range of error in equipment used to measure the values, for which ±5% may be expected. "First," "second," etc., re labels to distinguish components or blocks of otherwise similar names but does not imply any sequence or numerical limitation. "And/or" for two possibilities means either or both of the stated possibilities ("A and/or B" covers A alone, B alone, or both A and B take together), and when present with three or more stated possibilities means any individual possibility alone, all possibilities taken together, or some combination of possibilities that is less than all of the possibilities. The language in the format "at least one of A . . . and N" where A through N are possibilities means "and/or" for the stated possibilities.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

"Network" may refer to one or more network elements that are interconnected via communication paths. The network may include any number of software and/or hardware elements coupled to one another to establish the communication paths and route data/traffic via the established communication paths. Since a network may include one or more systems, and one or more systems may correspond to a network, hence the terms "network" and "system" are used interchangeably throughout the disclosure. "Network element" may comprise any element within the network that includes hardware, software, or combination of both. The network element can also include suitable interfaces for receiving, transmitting, and/or otherwise communicating data and/or information in a network environment. As non-limiting examples, the network element includes at least one of: a server, a controller, a router, a switch, a controller, a service, an application, and a database, and a storage. Further, the network element may be any component that is a part of a wireless network infrastructure such as but not limited to access points (on-premises or cloud), edge platforms, and the like.

"Event" refers to any activity within the network. The event may be general data for the network or specific data pertaining to one or more network elements within the network. The event may be associated with a timestamp and may be continuously generated similar to log data.

"Problem", specifically within context of this disclosure, refers to any abnormal activity within the network that is a potential deterrent to the smooth functioning of the network. As a non-limiting example, the problem includes a full loss of service to one or more network elements within the network or to the network as a whole. As yet another non-limiting example, the problem includes a degradation of service performance associated with one or more network elements within the network or the network as a whole. As another non-limiting example, the problem includes a partial loss of service to the one or more network elements within the network or to the network as a whole. As yet another non-limiting example, the problem includes reduced operational capacity of one or more network elements to a defined limit. As yet another non-limiting example, the problem includes a server outage predicted within the network.

"Data pipeline" refers to an end-to-end process in which data is collected, extracted, modified, and delivered. Such pipelines may be used by any enterprise or business to move data from one or more sources such as databases, applications, and other sources to a destination in order to facilitate storage, transformation, and further processing.

"Set" includes one or more components.

It should also be noted that in some alternative implementations, the functions/acts noted may occur out of the order noted in the figures. For example, two steps disclosed or shown in succession may in fact be executed substantially concurrently or may sometimes be executed in the reverse order, depending upon the functionality/acts involved.

For smooth functioning of any network, it is imperative that one or more network elements or components within the network perform their operations at expected efficiencies. However, any problem caused to the network due to malfunctioning, technical failure, sudden events, or breakdown of a network element poses a hindrance to routine operations of any enterprise or business. The problem caused has severe consequences and timely resolving the problem is a challenge in itself.

With application of prior knowledge about problems that occurred within a specific network, detecting the problem may become quicker over time. However, this approach focuses on fixing the problem after the problem has occurred and hence, is still likely to cause interruption to routine functioning of the network to some extent. Therefore, in view of the above-mentioned drawbacks, an objective of embodiments herein is to proactively predict problems that may occur within a network. By way of non-limiting example, a problem like server outage is predicted X hours such as but not limited to two hours ahead of its probable occurrence. Forecasting problems ahead of time is cost-efficient and time-efficient for any organization. With this type of solution, the users/customers will encounter little to no downtime due to technical failures. As a result, they can focus more on their core businesses rather than recovering from outages like problems. Further, with embodiments herein, since the outage would be predicted, hence remediation steps can be taken even before the outage occurs. The present disclosure describes the process of preventing problems within the network with a high degree of accuracy, using artificial intelligence (AI) and machine learning (ML) techniques.

For the sake of brevity and better understanding, server outage is considered as an example for the problem and outage prediction is the predicted problem. However, within the scope of disclosure, problems can be predicted within the network, which may be associated with a specific network element within the network, combination of network elements, or network as a whole.

Traditional attempts to outage prediction are based on monitoring metrics in combination with linear regression algorithms. The linear regression algorithms assume a linear relationship among the variables and tend to oversimplify the problems. Embodiments herein utilize system metrics in combination with event messages about specific network events. Reliance on the event messages and metrics recited herein predicts problems (such as outages) more accurately than traditional metric-based methods because the combination of event messages and metrics is used to form a unique set of vocabulary that could be used to characterize each outage from historical data. Further, the solutions discussed herein are more robust than the traditional metric-based methods because relationships modeled between the parameters may or may not follow conventional linear relationships, and further the combination of parameters exceeds the abilities allowed via linear regression-based approaches.

FIG. 1 shows a block diagram indicating components of an outage prediction system, according to an embodiment of the present disclosure. Initially, data related to a specific problem to be predicted is collected. In the current embodiment, data related to a server whose outage is to be predicted, is collected. Such data includes monitoring data which may include but is not limited to performance and capacity metrics data, event data, traces, system logs, and error messages. In fact, any data that indicates unusual activity of the server can be collected. The data described above is henceforth called as "incoming data."

Referring to FIG. 1, incoming data related to the server is collected after a predefined interval of time, e.g., after five minutes from a single or multiple sources. The collected data arrives in storage 102 with event notifications. The storage 102 stores the incoming data, which may include but is not limited to a container for objects comprising files and metadata on a public cloud storage platform.

The event notifications from the storage 102 are passed on to a queue 104, which may be a typical message queuing service that enables sending and retrieving messages of various types and sizes. An outage data pipeline 106 receives metrics data including the collected metrics from the storage 102 and messages along with their paths from the queue 104.

The outage data pipeline 106, which is typically a pipeline including outage data i.e., metrics and messages, performs functions of monitoring the queue 104 for event notifications and pulling data from the storage 102 at periodic intervals of time. The outage data pipeline 106 extracts feature data from the received data and writes it to an outage database 108. Further, since the outage data pipeline 106 keeps receiving data continuously, it discards local raw data.

The outage database 108, upon receiving the feature data, sends data within a specific/predetermined time window, such as one hour, two hours, or four hours, to an outage prediction pipeline 110. The outage prediction pipeline 110 reads last X hours of data, e.g., two hours or four hours from the outage database 108, sends data to an inference unit 112 for predictions, sends prediction results to destination(s) along with storing the results in a results database 114, and purges data older than last X hours from the outage database 108. The inference unit 112 hosts a model responsible for making predictions.

In an embodiment, once the outage data pipeline 106 is running at a point in time, it may require no further configuration to add or remove the data it is monitoring. Any notification that appears in the queue 104 can be processed. Further, the outage data pipeline 106 is capable of being added or removed from the queue 104 at any time without affecting already running pipelines.

The functionalities of the components in FIG. 1 may be realized by a single module or a set of modules. Further, a single module or a set of modules may realize the functionalities of multiple components of FIG. 1 in a distributed manner.

Figure 2:
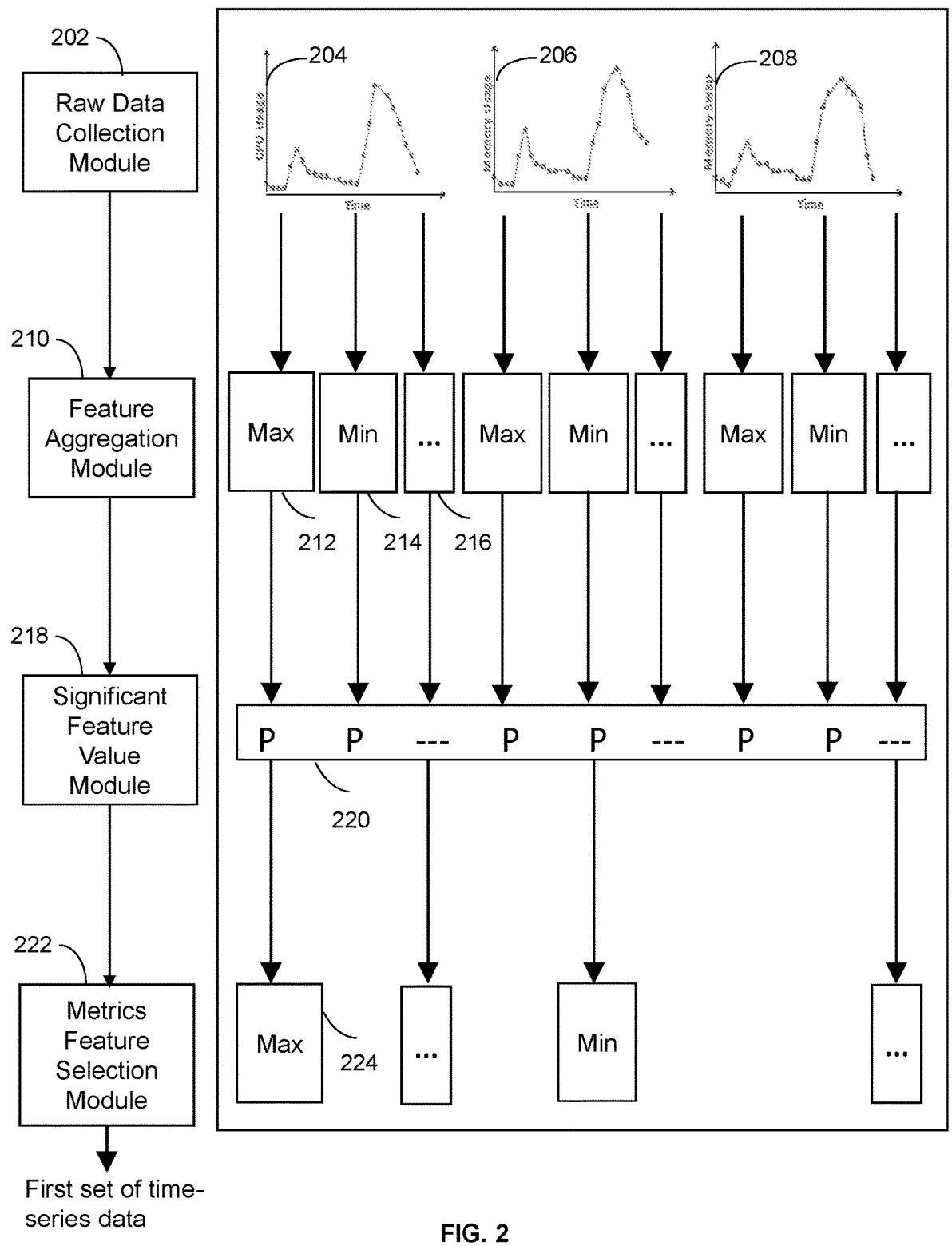
FIG. 2 shows a schematic representation of feature extraction from time-series data, according to an embodiment of the present disclosure.

FIG. 2 shows a schematic representation of feature extraction from time-series data, according to an embodiment of the present disclosure. FIG. 2 is explained herein in conjunction with FIG. 1. With reference to FIG. 1, two types of collected data are shown: the metrics data and the messages that are utilized by the outage data pipeline 106, the outage database 108, and the outage prediction pipeline 110. FIG. 2 focuses on the feature extraction of the metrics data using various modules.

The metrics data includes time-series data of metrics associated with the network element for which problem is predicted. Metrics data may be provided by a metrics collection and forwarding tool running on a server, although the invention is not limited to any particular program or source of information.

In the current embodiment, time-series data of metrics namely CPU usage, memory usage, memory swap, space usage, disk input/output operations, and system throughput are considered, although the invention is not limited to any specific metrics, and additional/alternative metrics may be considered. Non-limiting examples of other metrics that may additionally or alternatively be used include: network ping, network round trip measures, storage utilization, virtual machine metrics such as concurrent users, licenses consumed, security metrics such as port used/blocked, ports available, peak network requests, application resource consumption, user response time, page swaps, transaction rate, system availability whether the system or application is up and running or not, and application throughput i.e., how quickly can the business operations process information or transactions in a given amount of time, associated with a network element within the network.

For the sake of simplicity, the above-mentioned metrics are monitored for same/uniform period of time, e.g., two hours. However, at least one of the metrics may be monitored for a different time period to collect enough sampling data.

Referring to FIG. 2, raw time-series metric data is collected over a predetermined time window by a raw data collection module 202. Plots 204, 206, and 208 represent respective behavior of CPU usage, memory usage, and memory swap metrics over an exemplary two-hour window. It should be understood that the metrics depicted in FIG. 2 are for exemplary purpose and other metrics such as but not limited to space usage, disk input/output operations, and system throughput may also be considered additionally or alternatively as part of the raw time-series metric data collected by the raw data collection module 202. Since the sampling/metrics data is received after a predefined interval, e.g., five minutes, accordingly, the two-hour time window will include 24 data points, as depicted in corresponding plot.

Based on the data points collected by the raw data collection module 202, a feature aggregation module 210 is programmed to compute statistics for the collected data points. By way on non-limiting example, such statistics may include maximum, minimum, and average denoted by 212, 214, and 216 respectively, but the invention is not so limited and any other statistics as needed or desirable may be provided. Other non-limiting examples of statistics include standard deviation, median, range, and accuracy-related measures. Further, tests such as but not limited to R-square test, Tukey's test, and Chi square test may be utilized by the feature aggregation module 210 to compute the statistics.

The feature aggregation module 210 is programmed to perform statistical analysis on the collected network metrics, to capture a change/trend in the time-series. From a result of the statistical analysis performed by the feature aggregation module 210, a significant feature value module 218 is programmed to quantify the statistics to extract significant feature values as depicted by 220. There are multiple ways by which significant feature values could be identified. By way of non-limiting example, if there are two features that are highly corelated then one, out of the two correlated values, is selected. In another example, feature values previously identified as significant to outcome, such as outage prediction, are selected. By using machine learning techniques for feature selection, significant features and/or values could be identified. A non-limiting example of technique that can be used to identify significant feature values includes hypothesis testing, where based on p-value and significance level, null hypothesis is rejected and accordingly outcome of hypothesis testing is determined to be statistically significant. The invention is not limited to the methodology by which significant features are selected.

Based on the identified significant feature values by the significant feature value module 218, a set of relevant features are selected by a metrics feature selection module 222. The selected features, depicted as 224, may include maximum, minimum, and/or other statistical features of the metric data. In an embodiment, the selected features 224 may be a subset of the statistical features (212, 214, and 216) computed by the feature aggregation module 210. By way of a non-limiting example, Benjamini Yekutieli procedure or any other similar procedures may be applied to select the relevant features.

As a result, an output of processing the time-series data such as but not limited to CPU usage, memory usage, memory swap, space usage, disk input/output operations, and system throughput metrics within the predetermined time window includes a set of relevant features, which is referred as "first set of time-series data" henceforth.

Figure 3:
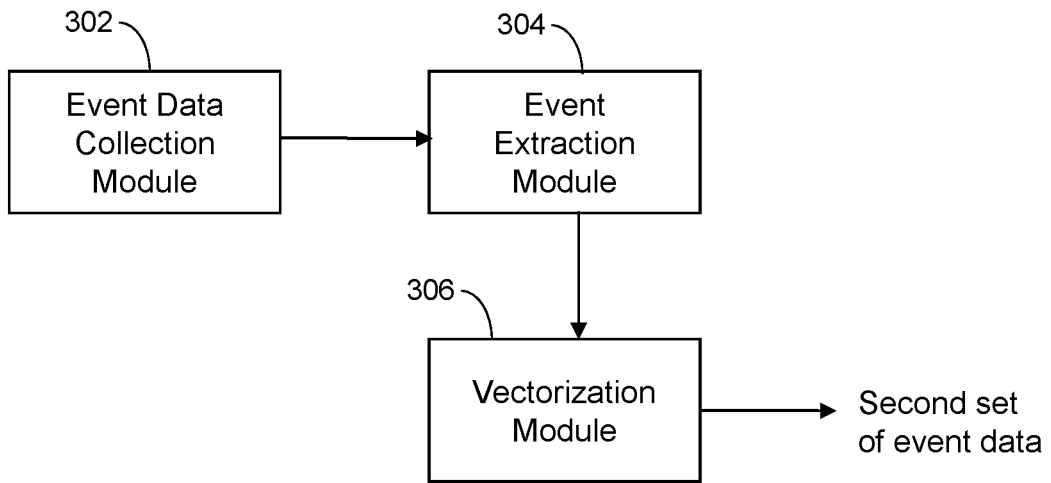
FIG. 3 shows a block diagram for feature extraction from messages, according to an embodiment of the present disclosure.

FIG. 3 shows a block diagram for feature extraction from messages, according to an embodiment of the present disclosure. FIG. 3 is explained herein in conjunction with FIG. 1. With reference to FIG. 1, two types of collected data are shown: metrics data and the messages that are utilized by the outage data pipeline 106, the outage database 108, and the outage prediction pipeline 110. FIG. 3 focuses on the feature extraction from the messages using various modules.

The messages include error messages, messages related to events, or any message related to abnormal or unusual activity happening in a system or application(s). The messages may be in the form of unstructured text, which may require additional analysis to extract the necessary insights. The messages may be provided by an event log forwarding tool, although the invention is not limited to any particular program or source of information. For sake of simplicity and context, messages will be referred to as "event messages" henceforth.

Referring to FIG. 3, event data or log information such as application events, system events, and security events are collected/tracked by an event data collection module 302. The tracking may be performed in a specific format for certain type of event collection.

From the tracked event logs, an event extraction module 304 is programmed to extract information from the event message(s). A non-limiting example of extracted information includes an event type (such as application, system, or security) and a predefined identifier (ID) associated with the event. However, without limitation, other information such as timestamp, server information such as server ID and server name, details on nature of event, and the like can be extracted for further processing by the event extraction module 304. The invention is not limited to the type of extracted data.

The event messages and the extracted text are not compatible for combination/use with the metric data. A vectorization module 306 is programmed to convert at least some of the extracted data into a numeric vector using natural language processing (NLP). In order to generate vectors, a unique combination of event type and ID is considered as a "word" and a vocabulary of words is created. The vocabulary is a collection of possible combinations of words, which are learned from training data. The created vocabulary may be considered analogous to a fingerprint and since the fingerprint has unique set of features, the vocabulary is likewise unique that may be used to characterize an outage like problem. Using the vocabulary, a word is converted into a vector by counting how many times that word appears in a sentence. The output is a feature set in numerical vector form, which is referred as "second set of event data" henceforth. In a non-limiting example, a bag-of-word vectorization technique may be used to generate vectors. The generated vectors uniquely characterize each outage from historical data.

Figure 4:
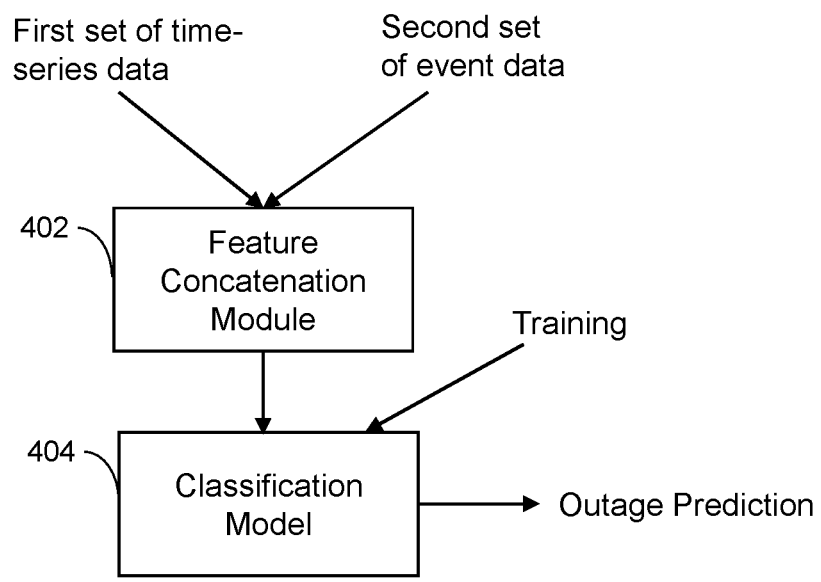
FIG. 4 shows a block diagram for outage prediction from feature extraction of time-series data and event messages with reference to FIGS. 2 and 3.

FIG. 4 shows a block diagram for outage prediction using results from feature extraction of time-series data and event messages with reference to previous figures.

Referring to FIG. 4, the first set of time-series data generated as an output of the metrics feature selection module 222 of FIG. 2 and the second set of event data generated as an output of the vectorization module 306 of FIG. 3 are fed as an input to a feature concatenation module 402. The feature concatenation module 402 combines or adds both the sets of time-series data and event data to create a single longer vector. Such a vector uniquely characterizes an outage from historical data.

A classification module 404 is a classifier that receives the single long vector from the feature concatenation module 402 as an input, and classifies the received input into one of the two classes i.e., normal scenario or outage scenario. The classification module 404 corresponds to the inference unit 112 discussed with reference to FIG. 1. By way of a non-limiting example, XGBoost classifier is utilized as the classification module 404. The classifier is implemented using a model that is trained in accordance with characteristics of target data set to make predictions using the trained model. As a result of the training, the classification module 404 predicts a probability of outage in real-time in a certain time period (e.g., two hours). It should be understood that the prediction of outage ahead of its probable occurrence is not limited to a specific time period, the time period may be set to values other than two hours and modified over time.

Without any limitation, any classification algorithm may be used to generate suitable predictions. As a non-limiting example, XGBoost may be used as a machine learning algorithm to predict probability of occurrence of problems such as outages.

Therefore, using real-value feature vector extracted from time series data (FIG. 2) and discrete-value feature vector extracted from messages/event data (FIG. 3) recorded during a same time period, an outage prediction is generated as an output of the classification module 404 (FIG. 4). The outage prediction may be indicated as an outage probability, such as 85%. However, based on the type of classification module used for prediction, a format in which result of prediction is generated may vary. As an example, the outage prediction may generate alerts, warnings, triggers, or incidents that indicate a probable outage scenario.

In the disclosed embodiments, the second set of event data generated using the vectorization module 306 produces outage 'fingerprints' that characterize an outage based on the historical (event) data. This collection of outage fingerprints when combined with the first set of time-series data pertaining to network conditions enables an accurate prediction of whether a given scenario has a potential of being an outage scenario. As a non-limiting example, such outage fingerprints from various outage scenarios in infrastructure, data or business applications and services, is used to predict the probability of problem occurrence. Further, it is not necessary that the disclosed embodiments are utilized for predicting problems such as outages, but they are equally applicable for monitoring probable incidents, alerts, triggers, or warnings that indicate any abnormal or unusual activity within the network.

Once the problem such as server outage is predicted, adequate steps can be taken to resolve the predicted problem. In an embodiment, in response to a result of the outage prediction being above a threshold, the network and/or activity within the network can be modified to avoid onset of the outage. In an exemplary embodiment, if a server outage probability is above a set threshold (e.g., 80%, although the invention is not limited to any value) then modifications to the associated server and/or network in which the server is placed, are made ahead in time of the predicted outage to prevent the server from facing the predicted outage. The threshold may be predefined or dynamically set based on a set of prediction results and may be updated continuously. Hence, as a consequence of the outage prediction, impending downtime that the server outage might have caused is prevented. In another embodiment, if a result of any problem prediction is an incident, trigger, or alert then corresponding actions can be taken to resolve the issues by modifying associated network elements, activity within the network, and/or the network for which the incident, trigger, or alert has been generated.

In some embodiments, modifying the network and/or activity within the network to prevent the predicted problem includes fully restoring a state of the network to an ideal state of the network such that the routine functions of the network are available. For example, in response to modifying certain parameters of a server in order to prevent predicted outage of the server, may result in a fully operational server performing one or more routine functions. In other embodiments, modifying the network and/or activity within the network to prevent the predicted problem includes partially restoring a state of the network to a threshold/limit. For example, in response to modifying certain parameters of a server in order to prevent predicted outage of the server, may result in the server being available with 60-80% operational capacity to perform certain functions or unavailability of certain functions as a result of the modification. There can be diverse scenarios in which the modification may take place in the network to prevent the problem from occurring. Such responsive modifications may occur automatically, via user intervention, or some combination thereof.

Figure 5:
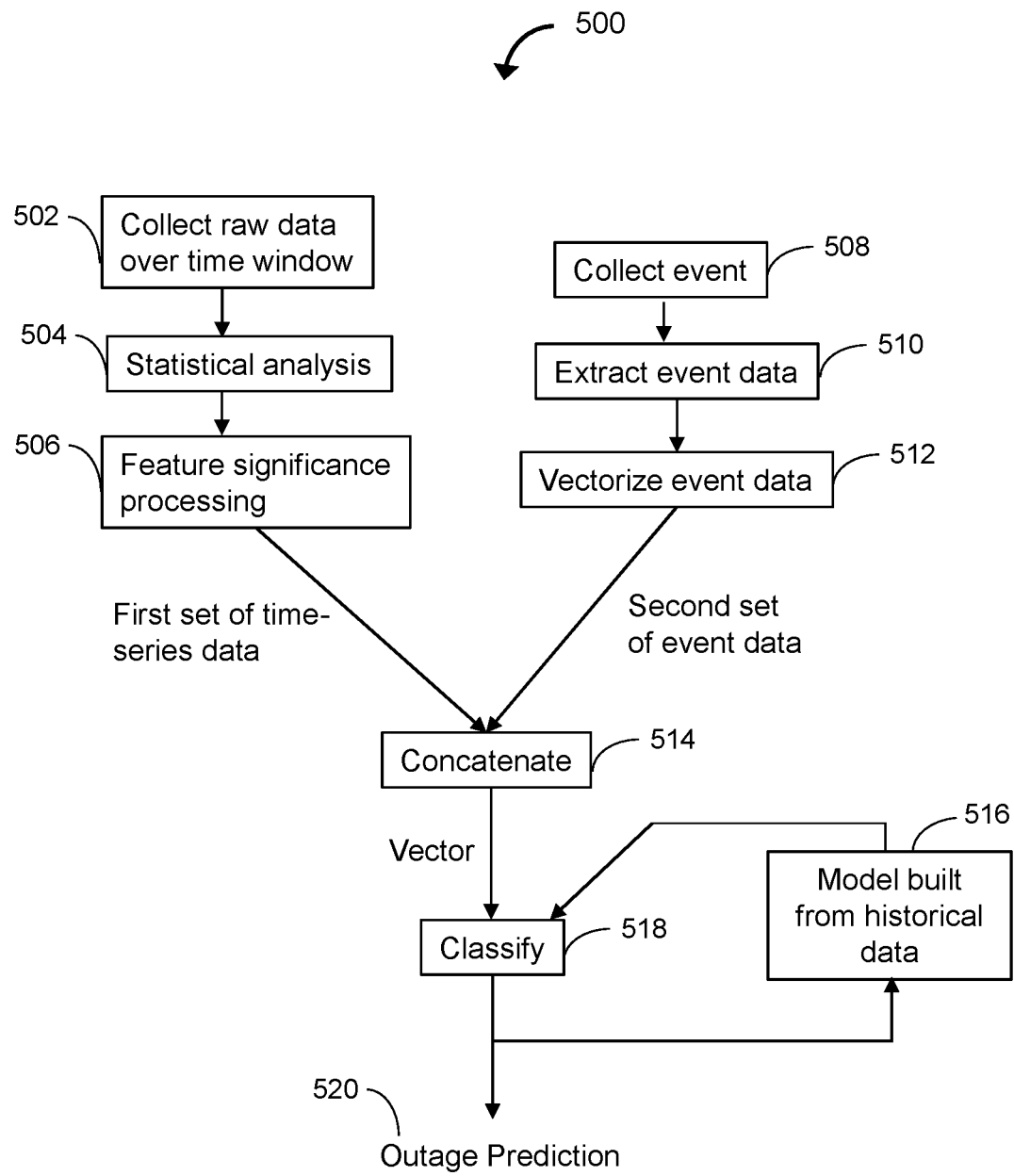
FIG. 5 shows a flowchart of an example method for outage prediction, according to an embodiment of the present disclosure.

FIG. 5 shows a flowchart 500 of an example methodology for outage prediction, according to an embodiment of the present disclosure. The methodology is performed to predict a problem within a network such that appropriate actions can be taken ahead in time to prevent the problem. It should be understood that there can be additional, fewer, or alternative steps performed in similar or alternative orders, or in parallel, based on the various features and embodiments discussed herein unless otherwise stated.

Although the flowchart 500 is described herein to predict a specific problem of server outage, however those of ordinary skill can apply the flowchart to any other problem with other network element(s) such as but not limited to a controller, a router, a switch, a controller, a service, an application, a database, and a storage. The flowchart disclosed herein utilizes two discrete types of data: time-series data of monitoring metrics and event logs data to predict the server outage.

The flowchart begins at block 502, where raw time-series metric data is collected over a predetermined time window. The raw data may pertain to any metrics related to outage prediction for a server. By way of non-limiting example, CPU usage, memory usage, memory swap, space usage, disk input/output operations, and system throughput metrics for the server over an exemplary two-hour window may be collected, and the two-hour window may be split into corresponding 24 data points due to sampling data received after every five minutes.

At block 504, statistical analysis of the collected raw time-series metric data is performed. As a result of the statistical analysis, statistics are computed for the corresponding network metric and accordingly a trend/change in the time-series data can be captured.

At block 506, feature significance processing is performed to quantify the computed statistics and identify significant features. Further, from the identified significant features, a set of relevant features are selected to generate/output a first set of time-series data. Therefore, a result of processing or analyzing the metrics data results in identifying a sub-set of features that are used for server outage prediction. In order to make the outage prediction more accurate, a second type of input data i.e., event logs or messages are processed for the same predetermined time window. The processing of event logs or messages may be performed in parallel with the processing of the time-series metrics data.

At block 508 event data or log information is collected, which may be for the same predetermined time window as that of the time-series metrics data. The event logs or log information including event messages for different events in an OS are collected. In a non-limiting example, event messages for WINDOWS server such as application events, system events, and security events may be collected. In another non-limiting example, event data may pertain to monitoring events or generic events from a monitoring system.

From the collected event data, at block 510, specific parameters of the event data such as event type and an identifier for the event may be extracted. The extracted parameters may depend on target data set.

In response to the extracted event data, which is typically a series of extracted words, vectorization is performed using NLP to convert the extracted words into numeric vectors, thereby generating a feature set in numerical vector form referred as a second set of event data. The first set of time-series data and the second set of event data are extracted feature sets from two different data sources to derive meaning that helps in predicting probable server outage.

Once the first set of time-series data and the second set of event data are generated by processing time-series metric data and event messages respectively, then at block 514, a single longer vector is created by combining or adding both the first set of time-series data and the second set of event data. The generated vector is then provided as an input to the classifier at block 518.

At block 518, a model 516 built from historical data is utilized by the classification module 404 to perform classification of the received input vector. The input vector uniquely characterizes an outage from historical data. Since the model 516 is built from the historical data, it is aware which type of inputs cause definite outages and which type of inputs prevent outages, hence the classifier classifies the received input vector into one of the two clauses i.e., normal scenario and outage scenario, based on the binary classification. Accordingly, an outage prediction 520 is generated, which is typically in form of outage probability. Alternatively, outage prediction 520 may be generated in form of incidents that are events having a potential of causing outage, alerts that indicate a potential problem, or triggers that indicate an action to be taken.

Subsequently, the outage prediction 520 is used as an indicator to resolve the predicted problem within the network before it even occurs. If the outage prediction is in form of outage probability, then in response to the outage probability being above a threshold, the network element such as server, activity within the network, and/or the network can be modified, to avoid onset of the outage. Alternatively, if a result of any problem prediction is in form of incidents, alerts, or triggers then corresponding actions can be taken to avoid the respective predicted problem for which the incident, trigger, or alert has been generated.

Figure 6:
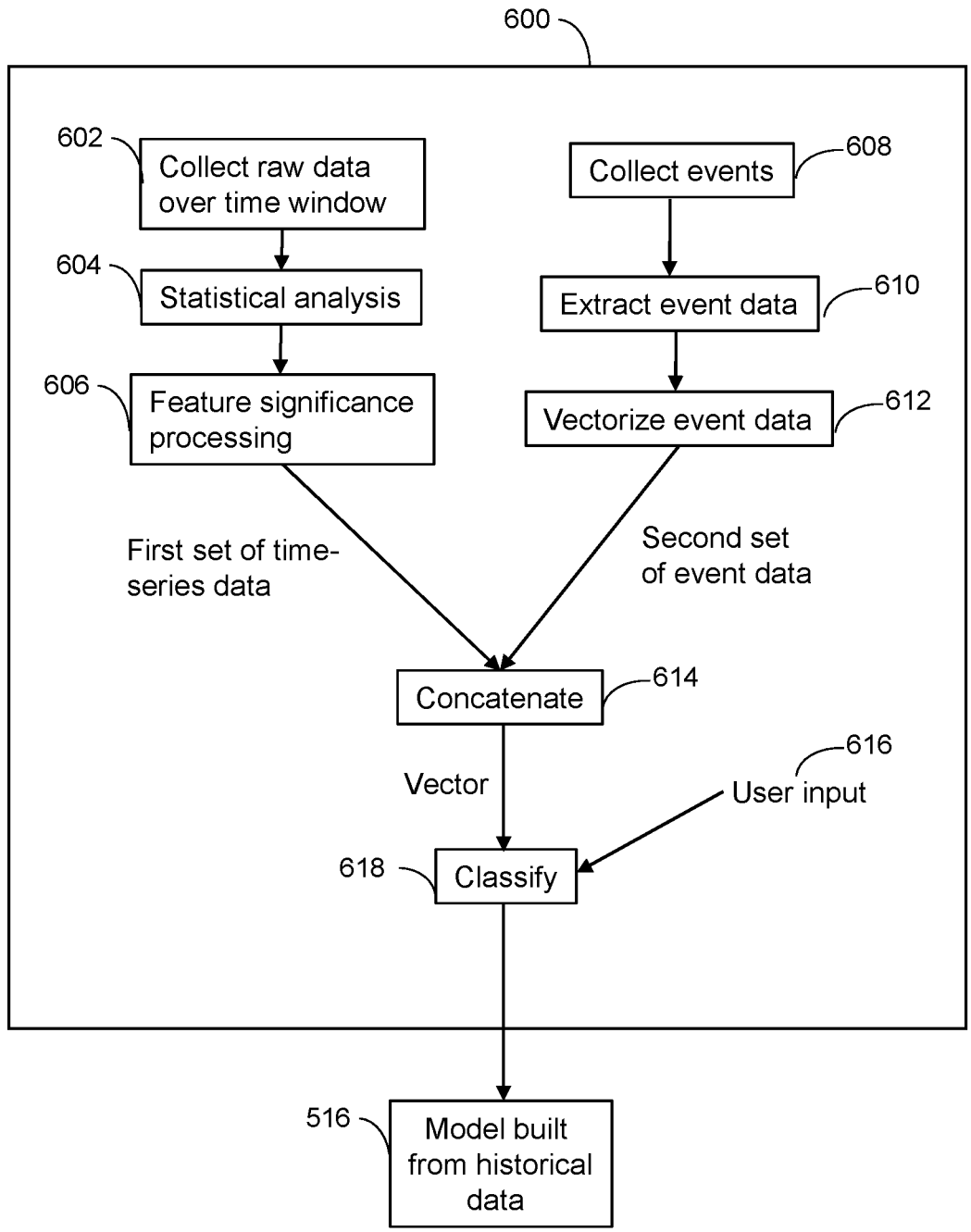
FIG. 6 shows a model training process to build a model that is utilized for outage prediction, according to an embodiment of the present disclosure.

FIG. 6 shows a flowchart 600 to build a model that is utilized for outage prediction, according to an embodiment of the present disclosure. FIG. 6 is explained herein in conjunction with previous figures. It should be understood that there can be additional, fewer, or alternative steps performed in similar or alternative orders, or in parallel, based on the various features and embodiments discussed herein unless otherwise stated.

Referring to FIG. 6, the flowchart 600 outlines a series of steps performed to train the model 516 built from historical data which is same as the model 516 used in the flowchart for outage prediction as previously discussed in FIG. 5. The model 516 is built from historical data and trained, using may use the classification module 404 or the classifier, as previously discussed in FIG. 4, classifies the incoming data. The classification module 404 may operates in two modes i.e., a training mode and a prediction mode. In the training mode, the flowchart 600 is followed to build the model while in the prediction mode, the classification module 404 classifies the received vector data using the trained model, to generate outage predictions. In the alternative, different classifiers can be used.

Steps 602, 604, and 606 of FIG. 6 correspond to activities performed by the raw data collection module 202, the feature aggregation module 210, the significant feature value module 218, and the metrics feature selection module 222 previously described with reference to FIG. 2, to generate the first set of time-series data. Similarly, steps 608, 610, and 612 of FIG. 6 correspond to activities performed by the event data collection module 302, the event extraction module 304, and the vectorization module 306 previously described with reference to FIG. 3, to generate the second set of event data. Further, steps 614 and 618 of FIG. 5 correspond to steps/functions performed by the feature concatenation module 402 and the classification module 404 previously described with reference to FIG. 4. For the sake of brevity, the description of these steps denoting previously described functions is not repeated.

In the training mode, steps 602 through step 614 are iteratively performed similar to a process or flowchart followed for generating outage predictions in the prediction mode. However, during the classification step 618 in the training mode, an additional user input 616 is provided to the classifier in binary form using hard labels, where "1" and "0" indicate whether an outage will happen or not (Yes or No). Hence, the classifier, on the basis of input vector data generated as a result of concatenation of the first set of time-series data and the second set of event data along with the user input 616, generates results which are then used to build the model 516 from historical data. This model 516 built from the historical data is used by the classifier in the prediction mode to generate outage predictions.

It should be understood that the embodiments described in the present disclosure are exemplified for predicting and preventing problems such as outages in context of a network. However, the outage prediction may be applied without limitation to problems in physical and cloud infrastructure (including system and network components), security components, data management components, business applications or services.

Figure 7:
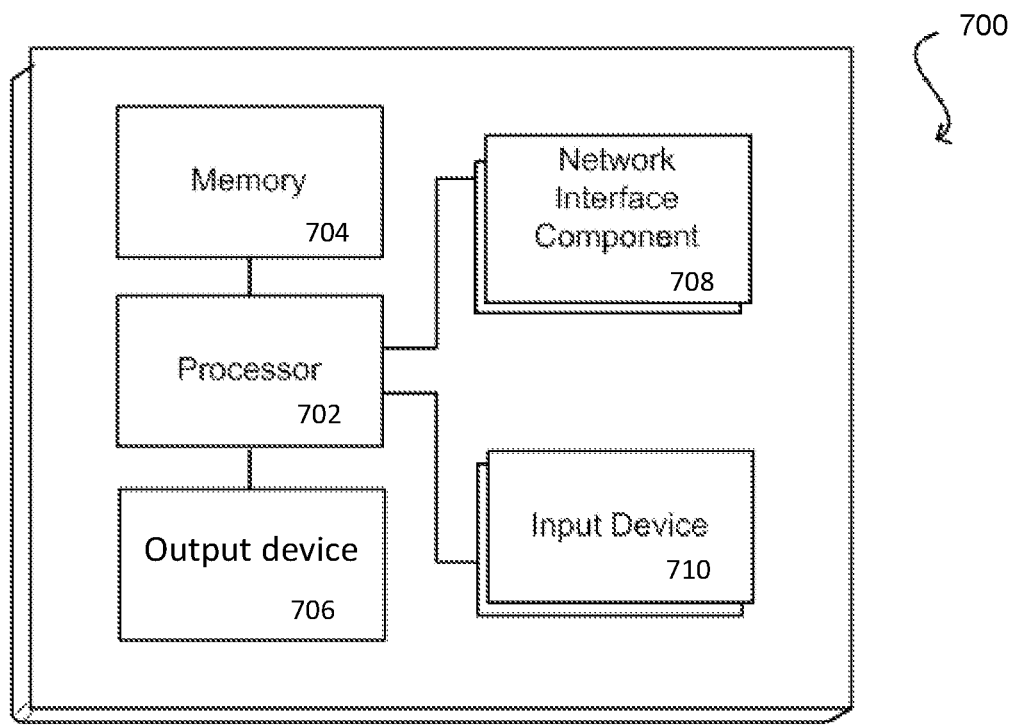
FIG. 7 shows an example of a computing system for implementing a method for outage prediction.

FIG. 7 shows an example of a computing system 700 for implementing a method for outage prediction. The computing system 700 may include computerized devices, where such computerized device can include hardware elements that may be electrically coupled via a bus, the elements include at least one processor (central processing unit (CPU) or processing unit) 702, that is communicatively coupled to other elements of the computing system 700 such as a memory 704, an output device 706, a network interface component 708, and an input device 710. The processor 702 can include any general-purpose processor as well as a special-purpose processor where software instructions are incorporated into the actual processor design. The processor 702 may essentially be a completely self-contained computing system, containing multiple cores or processors, a bus, memory controller, cache, etc. A multi-core processor may be symmetric or asymmetric.

The memory 704 may include one or more storage devices, such as disk drives, optic storage devices, and solid-state storage devices such as random-access memory ("RAM") or read-only memory ("ROM"), as well as removable media devices, memory cards, flash cards, etc. The memory 704 may also be a storage media and a computer readable media that contains code, or portions of code, can include any appropriate media known or used in the art. The storage media and communication media are, but not limited to, volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optic storage, magnetic cassettes, magnetic tape, magnetic disk storage or other magnetic storage devices, or any other medium which can be used to store the desired information and which can be accessed by a system device or the processor 702.

The storage media may be coupled to other devices of the computing system 700, such as a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information.

An environment including the computing system 700 can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate.

The computing system 700 includes at least one input device 710 (e.g., a mouse, keyboard, controller, touch screen, or keypad), and at least one output device 706 (e.g., a display device, printer, or speaker). The network interface component 708 supports communication between the computing system 700 other external systems or devices. Most embodiments utilize at least one network that would be familiar to those skilled in the art for supporting communications using any of a variety of commercially available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In an embodiment, the computerized device includes a Web server (not shown), the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C # or C++, or any scripting language, such as Perl, Python, or TCL, as well as combinations thereof. The server(s) may also include database servers, including without limitation those commercially available from Oracle®, Microsoft®, Sybase®, and IBM®.

The computing system 700 may be implemented in a serverless computing environment and/or cloud computing environment such as but not limited to Amazon's AWS, Microsoft's Azure, Google cloud, OpenStack, local docker environment (e.g., private cloud with support for implementing containers), local environment (e.g., private cloud) with support for virtual machines or microservices, and the like.

The computing system 700 and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose individual computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network. Based on the disclosure and teachings provided herein, an individual of ordinary skill in the art will appreciate other ways and/or methods to implement the various embodiments.

The one or more modules described in the present disclosure may comprise instructions that can be understood, processed, and executed by a processor on a computer. Further, the one or more modules may include hardware logic, software logic, or combinations thereof. Any of the modules or potential processing elements described in the present disclosure should be construed as being encompassed within the processor 702. Further, any of the storage elements or databases described in the present disclosure should be construed as being a part of the memory 704 on the computing system 700.

The specification and drawings are to be regarded in an illustrative rather than a restrictive sense. It will, however, be evident that various modifications and changes may be made thereunto without departing from the broader spirit and scope of the invention as set forth in any claims.

We claim:

1. A method, for preventing an outage in a network, comprising:
   collecting network metrics;
   statistically analyzing the collected network metrics from a predetermined time window to produce statistical features of the network during the time window;
   selecting, from the produced statistical features, a first data set of relevant ones of the produced statistical features;
   collecting information about a past event;
   extracting event data from the past event;
   vectorizing the extracted event data to form a second data set including the extracted event data;
   concatenating the first data set and the second data set to form a third data set;
   classifying the third data set relative to a model of historical network performance to determine a probability of the outage within the network; and
   modifying, in response to the probability of the outage being above a threshold, the network and/or activity within the network to avoid onset of the outage.

2. The method of claim 1, wherein the model is trained using same process from collecting the network metrics till classifying the third data set iteratively, to classify the third data set using the trained model.

3. The method of claim 1, wherein the extracted event data includes a type of event and a timestamp associated with the past event.

4. The method of claim 1, wherein the network metrics include Central Processing Unit (CPU) usage, memory usage, and memory swap associated with a server within the network.

5. The method of claim 1, wherein collecting the network metrics comprises sampling system metrics at predefined time intervals.

6. The method of claim 1, wherein the first data set of relevant ones of the produced statistical features is defined by a pre-existing model.

7. A non-transitory computer readable media storing instructions programmed to prevent an outage in a network and programmed to cooperate with a processor to perform operations, comprising:
   collecting network metrics;
   statistically analyzing the collected network metrics from a predetermined time window to produce statistical features of the network during the time window;
   selecting, from the produced statistical features, a first data set of relevant ones of the produced statistical features;
   collecting information about a past event;
   extracting event data from the past event;
   vectorizing the extracted event data to form a second data set including the extracted event data;

concatenating the first data set and the second data set to form a third data set;

classifying the third data set relative to a model of historical network performance to determine a probability of the outage within the network; and modifying, in response to the probability of the outage being above a threshold, the network and/or activity within the network to avoid onset of the outage.

8. The non-transitory computer readable media of claim 7, wherein the model is trained using same process from collecting the network metrics till classifying the third data set iteratively, to classify the third data set using the trained model.

9. The non-transitory computer readable media of claim 7, wherein the extracted event data includes a type of event and a timestamp associated with the past event.

10. The non-transitory computer readable media of claim 7, wherein the network metrics include Central Processing Unit (CPU) usage, memory usage, and memory swap associated with a server within the network.

11. The non-transitory computer readable media of claim 7, wherein collecting the network metrics comprises sampling system metrics at predefined time intervals.

12. The non-transitory computer readable media of claim 7, wherein the first data set of relevant ones of the produced statistical features is defined by a pre-existing model.

13. A system for preventing an outage in a network, comprising:
 a non-transitory computer readable media storing instructions;
 a processor programmed to cooperate with the instructions to perform operations comprising:
  collecting network metrics;
  statistically analyzing the collected network metrics from a predetermined time window to produce statistical features of the network during the time window;
  selecting, from the produced statistical features, a first data set of relevant ones of the produced statistical features;
  collecting information about a past event;
  extracting event data from the past event;
  vectorizing the extracted event data to form a second data set including the extracted event data;
  concatenating the first data set and the second data set to form a third data set;
  classifying the third data set relative to a model of historical network performance to determine a probability of the outage within the network; and
  modifying, in response to the probability of the outage being above a threshold, the network and/or activity within the network to avoid onset of the outage.

14. The system of claim 13, wherein the model is trained using same process from collecting the network metrics till classifying the third data set iteratively, to classify the third data set using the trained model.

15. The system of claim 13, wherein the extracted event data includes a type of event and a timestamp associated with the past event.

16. The system of claim 13, wherein the network metrics include Central Processing Unit (CPU) usage, memory usage, and memory swap associated with a server within the network.

17. The system of claim 13, wherein collecting the network metrics comprises sampling system metrics at predefined time intervals.

18. The system of claim 13, wherein the first data set of relevant ones of the produced statistical features is defined by a pre-existing model.

* * * * *